(12) United States Patent
Smith

(10) Patent No.: US 9,445,580 B1
(45) Date of Patent: Sep. 20, 2016

(54) AQUARIUM WATER TREATMENT DEVICE

(71) Applicant: Frderick Smith, New Bern, NC (US)

(72) Inventor: Frderick Smith, New Bern, NC (US)

(*) Notice: Subject to any disclaimer, the term of this patent is extended or adjusted under 35 U.S.C. 154(b) by 0 days.

(21) Appl. No.: 14/927,301

(22) Filed: Oct. 29, 2015

(51) Int. Cl.
*A01K 61/00* (2006.01)
*A01K 63/04* (2006.01)
*C02F 1/52* (2006.01)
*C02F 103/20* (2006.01)

(52) U.S. Cl.
CPC ............ *A01K 63/04* (2013.01); *A01K 63/047* (2013.01); *C02F 1/52* (2013.01); *C02F 1/5245* (2013.01); *C02F 2103/20* (2013.01)

(58) Field of Classification Search
CPC .. A01K 61/003; A01K 63/045; C02F 1/001; C02F 9/00
USPC ................................ 119/248, 259; 210/416.2
See application file for complete search history.

(56) References Cited

U.S. PATENT DOCUMENTS

| 4,390,422 A | 6/1983 | Mackrie et al. |
|---|---|---|
| D291,720 S | 9/1987 | Willinger et al. |
| 4,951,606 A | 8/1990 | Hartung |
| 5,282,980 A | 2/1994 | Kew et al. |
| 6,065,430 A | 5/2000 | Sheriff |
| 6,896,799 B2 * | 5/2005 | Ohanian ............... A01K 61/003 119/248 |
| 2007/0114182 A1 | 5/2007 | DePoli et al. |
| 2011/0108490 A1* | 5/2011 | Fischmann Torres .... E04H 4/12 210/712 |
| 2011/0204003 A1 | 8/2011 | Kaczor |

FOREIGN PATENT DOCUMENTS

WO    WO0133952    5/2001

* cited by examiner

*Primary Examiner* — Yvonne Abbott-Lewis

(57) ABSTRACT

An aquarium water treatment device for treatment aquarium water includes a housing that has a top and a bottom. A partition is frictionally coupled to a wall of the housing proximate to the bottom, defining a lower chamber and an upper chamber. A plurality of penetrations is positioned in the partition. A pump that is submersible has an intake, positionable in an aquarium, and an outflow that is fluidically connected to the lower chamber. The pump is configured to transfer water requiring treatment from the aquarium to the lower chamber. A coagulation promoter and a flocculation promoter can be added as required to the housing such that solids in the water are induced to form a sludge bed above and below the partition. A nozzle is positioned proximate to the top and fluidically connected to the upper chamber so that clarified water flows back into the aquarium.

20 Claims, 4 Drawing Sheets

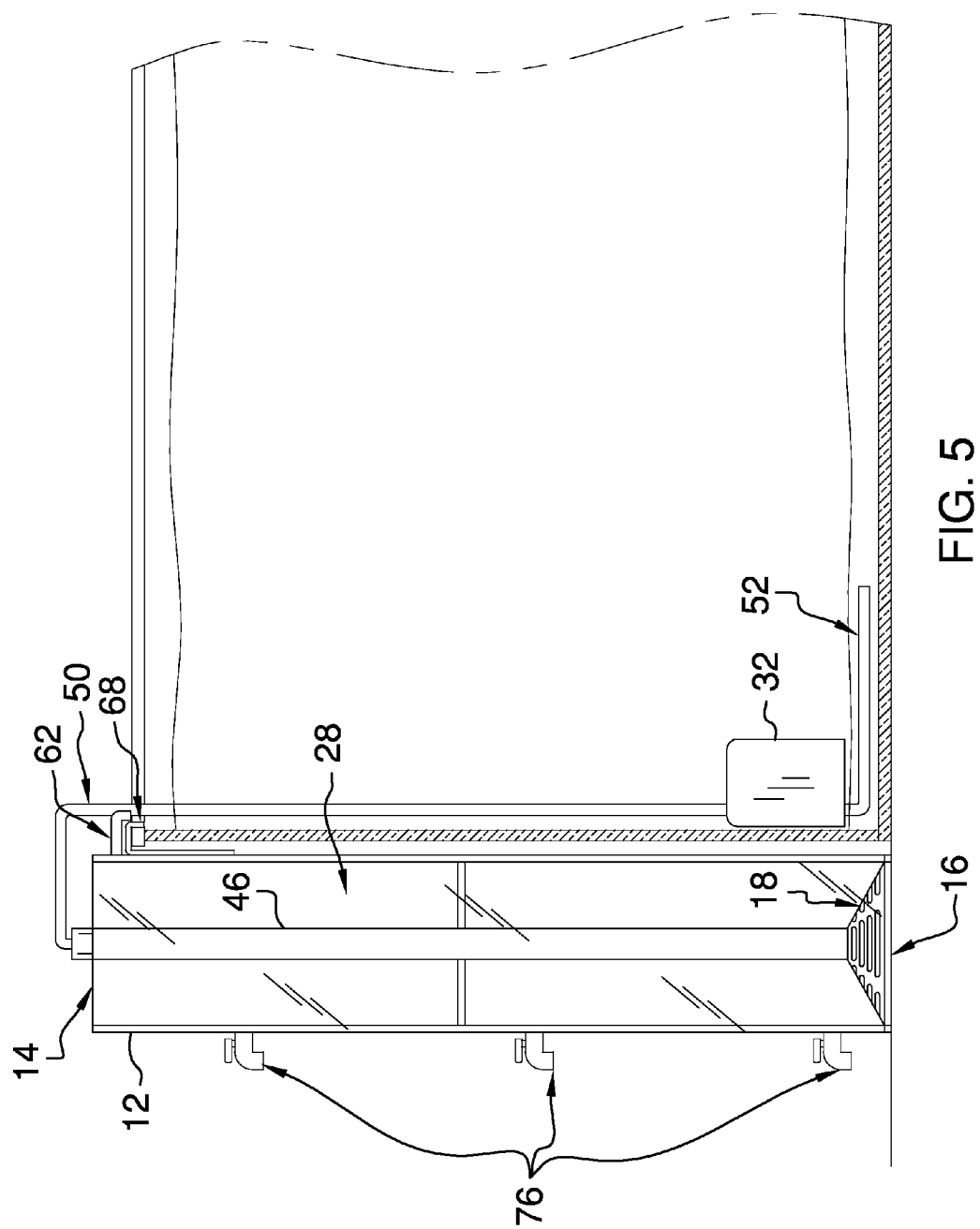

AQUARIUM WATER TREATMENT DEVICE

BACKGROUND OF THE DISCLOSURE

Field of the Disclosure

The disclosure relates to water treatment devices and more particularly pertains to a new water treatment device for treatment aquarium water.

SUMMARY OF THE DISCLOSURE

An embodiment of the disclosure meets the needs presented above by generally comprising a housing that has a top and a bottom. A partition is frictionally coupled to a wall of the housing proximate to the bottom, defining a lower chamber and an upper chamber. A plurality of penetrations is positioned in the partition. A pump that is submersible has an intake, positionable in an aquarium, and an outflow that is fluidically connected to the lower chamber. The pump is configured to transfer water requiring treatment from the aquarium to the lower chamber. A coagulation promoter and a flocculation promoter can be added as required to the housing such that solids in the water are induced to form a sludge bed above and below the partition. A nozzle is positioned proximate to the top and fluidically connected to the upper chamber so that clarified water flows back into the aquarium.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 5 is an in-use view of an embodiment of the disclosure.

DESCRIPTION OF THE PREFERRED EMBODIMENT

Figure 1:
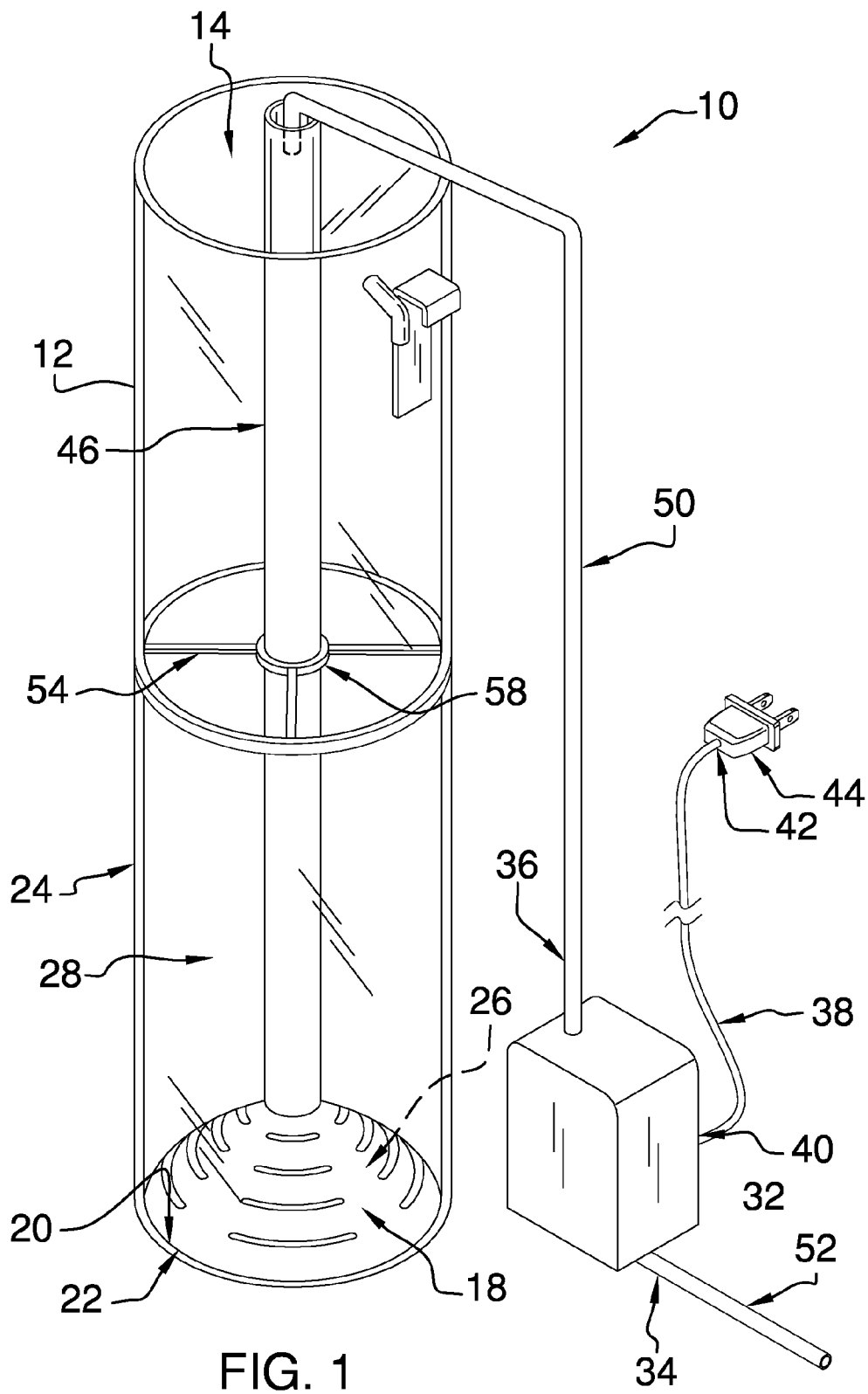
FIG. 1 is a front isometric perspective view of an aquarium water treatment device according to an embodiment of the disclosure.
Figure 2:
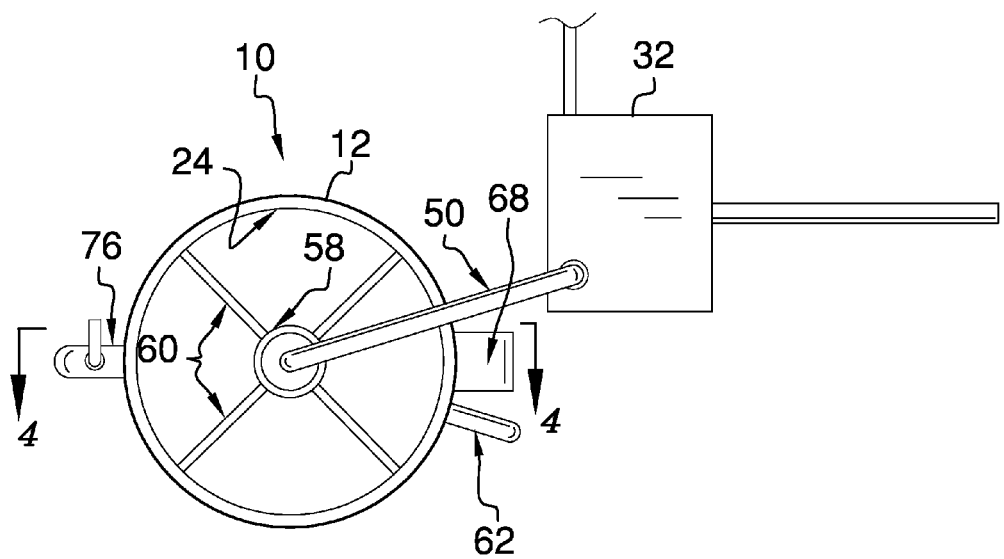
FIG. 2 is a top view of an embodiment of the disclosure.
Figure 3:
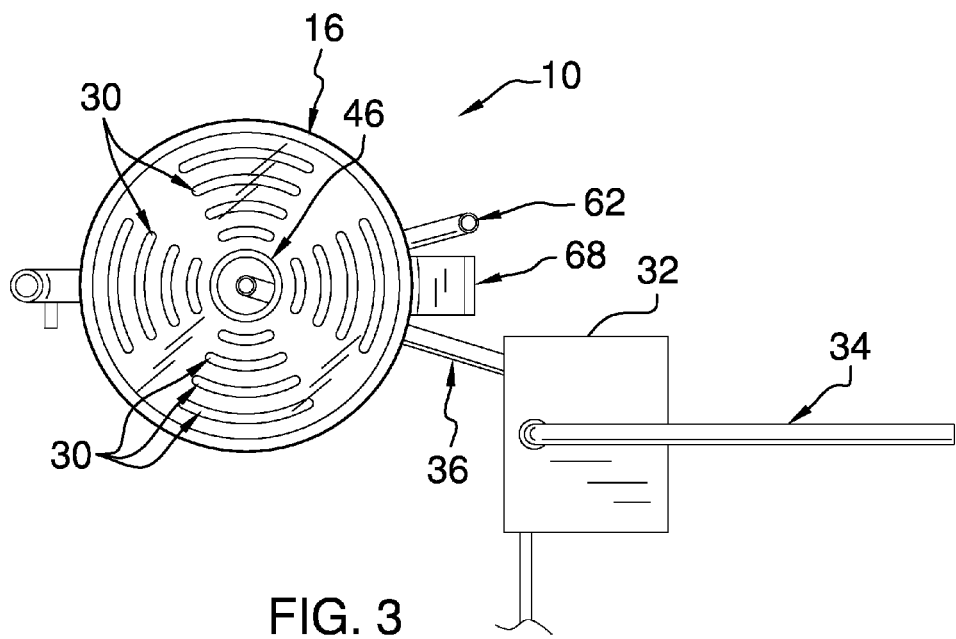
FIG. 3 is a bottom view of an embodiment of the disclosure.
Figure 4:
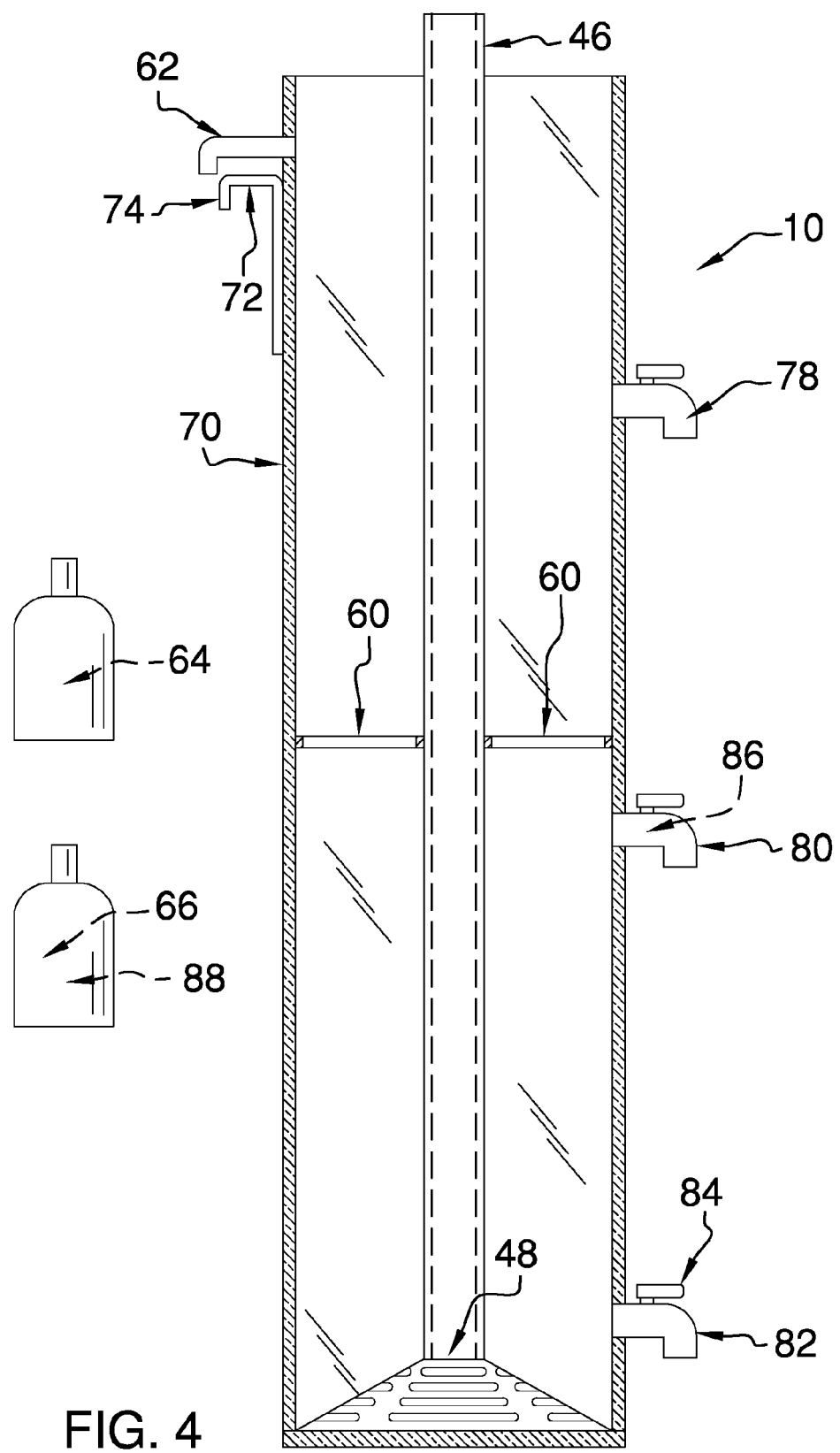
FIG. 4 is a cross-sectional view of an embodiment of the disclosure.

With reference now to the drawings, and in particular to FIGS. 1 through 5 thereof, a new water treatment device embodying the principles and concepts of an embodiment of the disclosure and generally designated by the reference numeral 10 will be described.

As best illustrated in FIGS. 1 through 5, the aquarium water treatment device 10 generally comprises a housing 12 that has a top 14 and a bottom 16. The bottom 16 is closed and the top 14 is open. The top 14 and the bottom 16 are circular, such that the housing 12 is tubular. The housing 12 is transparent. The housing 12 has capacity of between 1 and 10 liters. Preferably, the housing 12 has capacity of between 2 and 7 liters. More preferably, the housing 12 has capacity of between 3 and 5 liters.

A partition 18 that has a border 20 complimentary to an inner perimeter 22 of the housing 12 is frictionally coupled to a wall 24 of the housing 12 proximate to the bottom 16. The partition 18 defines a lower chamber 26 and an upper chamber 28. Preferably, the border 20 is positioned adjacent to the bottom 16 and the partition 18 extends upwardly from the bottom 16, such that the lower chamber 26 is domed. The border 20 may be coupled to the inner perimeter 22. A plurality of penetrations 30 is positioned in the partition 18.

A pump 32, which is submersible, has an intake 34 that is positionable in an aquarium containing water requiring treatment. The pump 32 also has an outflow 36 that is fluidically connected to the lower chamber 26. A power cord 38 has a first end 40 and a second end 42. The first end 40 is operationally couple to the pump 32. A coupler 44 is coupled to a second end 42 of the power cord 38, such that the coupler 42 is configured to connect the pump 32 to a power source.

A pipe 46 is coupled to a center 48 of the partition 18. The pipe 46 extends upwardly to proximate to the top 14 of the housing 12. The pipe 46 is fluidically connected to the outflow 36 and the lower chamber 26. The outflow 36 comprises a hose 50 coupled to the pump 32. The hose 50 is positionable in the pipe 46, such that the hose 50 is positioned to direct output from the pump 32 through the pipe 46 to the lower chamber 26. The intake 34 comprises a tube 52 that extends laterally from the pump 32, such that the tube 52 is positionable along the bottom of the aquarium.

A support 54 is coupled to a wall 24 of the housing 12. The support 54 is coupled to the pipe 46, such that the pipe 46 is stabilized longitudinally relative to the housing 12. The support 54 is variably positionable from the top 14 and the bottom 16. The support 54 comprises a ring 58 that is complimentary to the pipe 46, such that the pipe 46 is insertable into the ring 58. Each of a plurality of laterals 60 is coupled to the ring 58 and extends to the wall 24, such that the laterals 60 frictionally engage the wall 24. Preferably, the plurality of laterals 60 comprises four laterals 60 positioned at 90 degrees around the ring 58. Each of the laterals 60 may be fixedly coupled to the wall 24. The ring 58 is positioned for insertion of the pipe 46 and the laterals 60 are positioned to engage the wall 24 such that the pipe 46 is stabilized longitudinally relative to the housing 12. Each of the plurality of laterals 60 may be fixedly coupled to the wall 12, such that the support 54 is fixedly positioned substantially equally from the top 14 and the bottom 16.

A nozzle 62 is positioned proximate to the top 14. The nozzle 62 is fluidically connected to the upper chamber 28, such that the nozzle 62 is positioned to allow water to flow from the upper chamber 28 into the aquarium.

The device 10 also includes a coagulation promoter 64 and a flocculation promoter 66. The coagulation promoter 64 may be inorganic. Preferably, the coagulation promoter 64 is selected from the group consisting of $Al_2O_3$, $Al_2(SO_4)_3 (H_2O)_n$, n=14-18, $AlCl_3\ 6H_2O$, $Fe_2(SO_4)_3\ 9H_2O$, $FeCl_3$, and $Na_2Al_2O_4$. The coagulation promotor 64 also could be organic, comprising, for example, polyacrylic acid-based polymers of polyacrylamide. The coagulation promoter 64 may be aqueous. Preferably, the coagulation solution 64 comprises aqueous $Al_2O_3$. The flocculation promoter 66 comprises a polyelectrolyte 88, which may be cationic, anionic, or non-ionic and are readily apparent and obvious to one skilled in the art. The flocculation promoter 66 may be aqueous.

A hanger 68 is coupled to an outside surface 70 of the housing 12 proximate to the top 14. The hanger 68 is configured to extend over the rim of the aquarium to prevent lateral movement of the housing 12 relative to the aquarium. The hanger 68 comprises a horizontal plate 72 coupled to the outside surface 70. A vertical plate 74 is coupled to the horizontal plate 72 distally from the outside surface 70. The vertical plate 74 extends downwardly toward the bottom 16 of the housing 12. The horizontal plate 72 is configured to extend over the rim of the aquarium with the vertical plate 74 configured to prevent lateral movement of the housing 12 relative to the aquarium. The hanger 68 is configurable to position the housing 12 on the exterior of the aquarium.

Each of a plurality of spigots 76 is positioned in the wall 24 and fluidically coupled to the upper chamber 28. The plurality of spigots 76 may comprise an upper spigot 78 positioned proximate to the top 14, a center spigot 80 positioned approximately equally from the top 14 and the bottom 16, and a bottom spigot 82 positioned proximate to the bottom 16. The upper spigot 78 is positioned substantially opposite the hanger 68 on the housing 12. The upper spigot 78, center spigot 80 and bottom spigot 82 are vertically aligned. Each spigot 76 comprises a handle 84 operationally coupled to a valve 86. The valve 86 can be opened using a respective handle 84 to drain sludge from the upper chamber 28 through a respective spigot 76 positioned in the wall 24.

In use, the pump 32 is configured to transfer water requiring treatment from an aquarium to the lower chamber 26. The coagulation promoter 64 and the flocculation promoter 66 can be added as required to the housing 12 such that solids in the water are induced by to form a sludge bed above and below the partition 18. The clarified water flows through the nozzle 62 back into the aquarium. Sludge can be drain from the housing 12 using the plurality of spigots 76.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An aquarium water treatment device comprising:
    a housing, said housing having a top and a bottom, said bottom being closed;
    a partition, said partition having a border complimentary to an inner perimeter of said housing, said partition being frictionally coupled to a wall of said housing proximate to said bottom, defining a lower chamber and an upper chamber;
    a plurality of penetrations, said penetrations being positioned in said partition;
    a pump, said pump being submersible, said pump having an intake, wherein said intake is positionable in an aquarium containing water requiring treatment, said pump having an outflow, said outflow being fluidically connected to said lower chamber;
    a nozzle, said nozzle being positioned proximate to said top, said nozzle being fluidically connected to said upper chamber;
    a coagulation promoter, said coagulation promoter being inorganic;
    a flocculation promoter, said flocculation promoter comprising a polyelectrolyte; and
    wherein said pump is configured to transfer water requiring treatment from an aquarium to said lower chamber, and wherein said coagulation promoter and said flocculation promoter can be added as required to said housing such that solids in the water are induced by to form a sludge bed above and below said partition, such that clarified water flows through said nozzle back into the aquarium.

2. The device of claim 1, further comprising:
    said top being open;
    said top and said bottom being circular, such that said housing is tubular; and
    said housing being transparent.

3. The device of claim 1, further including said housing having capacity of between 1 and 10 liters.

4. The device of claim 3, further including said housing having capacity of between 2 and 7 liters.

5. The device of claim 4, further including said housing having capacity of between 3 and 5 liters.

6. The device of claim 1, further comprising:
    said border being positioned adjacent to said bottom;
    said partition extending upwardly from said bottom; and
    said lower chamber being domed.

7. The device of claim 1, further comprising:
    a power cord, said power cord having a first end operationally couple to said pump;
    a coupler, said coupler being coupled to a second end of said power cord; and
    wherein said coupler is configured to connect said pump to a power source.

8. The device of claim 1, further comprising:
    a pipe, said pipe being coupled to a center of said partition, said pipe extending upwardly to proximate to said top of said housing, said pipe being fluidically connected to said outflow and said lower chamber; and
    said outflow comprising a hose coupled to said pump, said hose being positionable in said pipe, such that said hose is positioned to direct output from said pump through said pipe to said lower chamber.

9. The device of claim 8, further including a support, said support being coupled to a wall of said housing, said support being coupled to said pipe, such that said pipe is stabilized longitudinally relative to said housing, said support being variably positionable from said top and said bottom.

10. The device of claim 9, further including said support comprising:
- a ring, said ring being complimentary to said pipe, such that said pipe is insertable into said ring;
- a plurality of laterals, each of said laterals being coupled to said ring and extending to said wall, such that said laterals frictionally engage said wall, said plurality of laterals comprising four laterals positioned at 90 degrees around said ring; and
- wherein said ring is positioned for insertion of said pipe and said laterals are positioned to engage said wall such that said pipe is stabilized longitudinally relative to said housing.

11. The device of claim 10, further comprising:
- said border being fixedly coupled to said inner perimeter;
- each of said plurality of laterals being fixedly coupled to said wall; and
- wherein said support is fixedly positioned substantially equally from said top and said bottom.

12. The device of claim 1, further including said intake comprising a tube, said tube extending laterally from said pump, such that said tube is positionable along the bottom of the aquarium.

13. The device of claim 1, further including a hanger, said hanger being coupled to an outside surface of said housing proximate to said top, such that said hanger is configured to extend over the rim of the aquarium to prevent lateral movement of the housing relative to the aquarium.

14. The device of claim 13, further including said hanger comprising:
- a horizontal plate coupled to said outside surface;
- a vertical plate coupled to said horizontal plate distally from said outside surface, said vertical plate extending downwardly toward said bottom of said housing; and
- wherein said horizontal plate is configured to extend over the rim of the aquarium with said vertical plate configured to prevent lateral movement of the housing relative to the aquarium.

15. The device of claim 1, further including a plurality of spigots, each said spigots being positioned in said wall and fluidically coupled to said upper chamber, such that said spigots are positioned to drain sludge from said upper chamber through a respective spigot positioned in said wall.

16. The device of claim 15, further including said plurality of spigots comprising:
- an upper spigot positioned proximate to said top;
- a center spigot positioned approximately equally from said top and said bottom;
- a bottom spigot positioned proximate to said bottom,
- said upper spigot being positioned substantially opposite said hanger on said housing;
- said upper spigot, said center spigot and said bottom spigot being vertically aligned,
- each said spigot comprising a handle operationally coupled to a valve; and
- wherein said valve can be opened using a respective handle to drain sludge from said upper chamber through a respective spigot positioned in said wall.

17. The device of claim 1, further including said coagulation promoter being selected from the group consisting of $Al_2O_3$, $Al_2(SO_4)_3(H_2O)_n$ n=14-18, $AlCl_3$ $6H_2O$, $Fe_2(SO_4)_3$ $9H_2O$, $FeCl_3$, and $Na_2Al_2O_4$.

18. The device of claim 17, further including said coagulation solution comprising aqueous $Al_2O_3$.

19. The device of claim 1, further including said coagulation promoter and said flocculation promoter being aqueous.

20. An aquarium water treatment device comprising:
- a housing, said housing having a top and a bottom, said bottom being closed; said top being open, said top and said bottom being circular, such that said housing is tubular, said housing being transparent, said housing having capacity of between 1 and 10 liters, said housing having capacity of between 2 and 7 liters, said housing having capacity of between 3 and 5 liters;
- a partition, said partition having a border complimentary to an inner perimeter of said housing, said partition being frictionally coupled to a wall of said housing proximate to said bottom, defining a lower chamber and an upper chamber, said border being positioned adjacent to said bottom, said partition extending upwardly from said bottom, said lower chamber being domed, said border being coupled to said inner perimeter;
- a plurality of penetrations, said penetrations being positioned in said partition;
- a pump, said pump being submersible, said pump having an intake, wherein said intake is positionable in an aquarium containing water requiring treatment, said pump having an outflow, said outflow being fluidically connected to said lower chamber;
- a power cord, said power cord having a first end operationally couple to said pump,
- a coupler, said coupler being coupled to a second end of said power cord, such that said coupler is configured to connect said pump to a power source;
- a pipe, said pipe being coupled to a center of said partition, said pipe extending upwardly to proximate to said top of said housing, said pipe being fluidically connected to said outflow and said lower chamber;
- said outflow comprising a hose coupled to said pump, said hose being positionable in said pipe, such that said hose is positioned to direct output from said pump through said pipe to said lower chamber;
- said intake comprising a tube, said tube extending laterally from said pump, such that said tube is positionable along the bottom of the aquarium;
- a support, said support being coupled to a wall of said housing, said support being coupled to said pipe, such that said pipe is stabilized longitudinally relative to said housing, said support being variably positionable from said top and said bottom, said support comprising:
    - a ring, said ring being complimentary to said pipe, such that said pipe is insertable into said ring,
    - a plurality of laterals, each of said laterals being coupled to said ring and extending to said wall, such that said laterals frictionally engage said wall, said plurality of laterals comprising four laterals positioned at 90 degrees around said ring, each of said laterals being fixedly coupled to said wall, and
    - wherein said ring is positioned for insertion of said pipe and said laterals are positioned to engage said wall such that said pipe is stabilized longitudinally relative to said housing;
- each of said plurality of laterals being coupled to said wall, such that said support is fixedly positioned substantially equally from said top and said bottom;
- a nozzle, said nozzle being positioned proximate to said top, said nozzle being fluidically connected to said upper chamber, such that said nozzle is positionable to allow water to flow from said upper chamber into the aquarium;
- a coagulation promoter, said coagulation promoter being inorganic, said coagulation promoter being selected from the group consisting of $Al_2O_3$, $Al_2(SO_4)_3 \cdot (H_2O)_n$, n=14-18, $AlCl_3 \cdot 6H_2O$, $Fe_2(SO_4)_3 \cdot 9H_2O$, $FeCl_3$, and $Na_2Al_2O_4$, said coagulation promoter being aqueous, said coagulation solution comprising aqueous $Al_2O_3$, a flocculation promoter, said flocculation promoter comprising a polyelectrolyte, said polyelectrolyte being cationic, said polyelectrolyte being anionic, said polyelectrolyte being non-ionic, said flocculation promoter being aqueous;

a hanger, said hanger being coupled to an outside surface of said housing proximate to said top, such that said hanger is configured to extend over the rim of the aquarium to prevent lateral movement of the housing relative to the aquarium; said hanger comprising:
 a horizontal plate coupled to said outside surface,
 a vertical plate coupled to said horizontal plate distally from said outside surface, said vertical plate extending downwardly toward said bottom of said housing, and
 wherein said horizontal plate is configured to extend over the rim of the aquarium with said vertical plate configured to prevent lateral movement of the housing relative to the aquarium;

said hanger being configured to position said housing on the exterior of the aquarium;

a plurality of spigots, each said spigots being positioned in said wall and fluidically coupled to said upper chamber, said plurality of spigots comprising:
 an upper spigot positioned proximate to said top,
 a center spigot positioned approximately equally from said top and said bottom,
 a bottom spigot positioned proximate to said bottom,
 said upper spigot being positioned substantially opposite said hanger on said housing,
 said upper spigot, said center spigot and said bottom spigot being vertically aligned,
 each said spigot comprising a handle operationally coupled to a valve, and
 wherein said valve can be opened using a respective handle to drain sludge from said upper chamber through a respective spigot positioned in said wall;

wherein said pump is configured to transfer water requiring treatment from an aquarium to said lower chamber, and wherein said coagulation promoter and said flocculation promoter can be added as required to said housing such that solids in the water are induced by to form a sludge bed above and below said partition, such that clarified water flows through said nozzle back into the aquarium.

\* \* \* \* \*